United States Patent [19]

Barthelemy

[11] Patent Number: 4,948,858
[45] Date of Patent: Aug. 14, 1990

[54] PREPARATION OF DIORGANOPOLYSILOXYLATED DIAMINES

[75] Inventor: Pascal Barthelemy, Lyons, France

[73] Assignee: Rhone-Poulenc Chimie, Courbevoie, France

[21] Appl. No.: 159,906

[22] Filed: Feb. 24, 1988

[30] Foreign Application Priority Data

Feb. 24, 1987 [FR] France ............................... 87/02614

[51] Int. Cl.$^5$ ............................................. C08G 77/08
[52] U.S. Cl. ........................................ 528/15; 528/28; 528/31; 556/423
[58] Field of Search ............................ 528/15, 28, 31; 556/423

[56] References Cited

U.S. PATENT DOCUMENTS 2,913,474 11/1959 Bailey ...................................... 528/15
3,176,034 3/1965 Clark ...................................... 528/15
3,513,184 5/1970 Brison et al. ........................... 528/15

FOREIGN PATENT DOCUMENTS 1409742 10/1975 United Kingdom .

Primary Examiner—Melvyn I. Marquis
Assistant Examiner—Ralph Dean, Jr.
Attorney, Agent, or Firm—Burns, Doane, Swecker & Mathis

[57] ABSTRACT

The alpha, omega-bis (aminophenoxyalkyl)diorganopolysiloxanes having the following general formula (I):

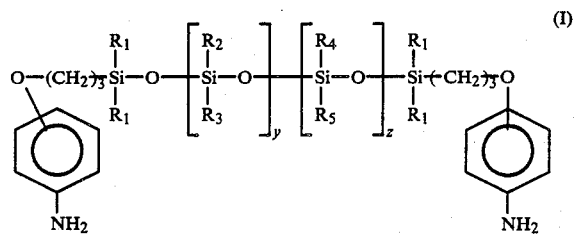

are improvedly prepared, with essentially 100% selectivity, by direct hydrosilylation, in bulk, between an alkyloxyaniline and an alpha, omega-bis(hydrogeno) diorganopolysiloxane.

5 Claims, No Drawings

PREPARATION OF DIORGANOPOLYSILOXYLATED DIAMINES

CROSS REFERENCE TO COMPANION APPLICATIONS

Application Ser. No. 159,911, filed Feb. 24, 1988, now U.S. Pat. No. 4,849,490 and application Ser. No. 159,907, filed Feb. 24, 1988, now U.S. Pat. No. 4,829,138, both assigned to the assignee hereof are crossed reference.

BACKGROUND OF THE INVENTION

1. Field of the Invention

The present invention relates to a novel process for the preparation of aromatic diamines containing a diorganopolysiloxane linkage, and, more especially, to a novel process for the preparation of alpha, omega-bis-(aminophenoxyalkyl)diorganopolysiloxanes.

2. Description of the Prior Art

The subject diamines are compounds which are known to this art. They are described, for example, in British Pat. No. 1,062,418 and U.S. Pat. No. 4,395,527; they may be represented by the following general formula:

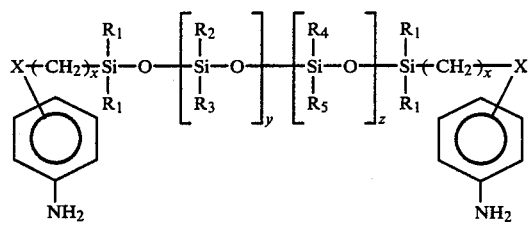

in which:

X, which is in the ortho, meta or para position relative to the carbon atom of the benzene ring bonded to nitrogen, represents, for example, an atom or group below:

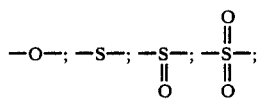

$R_1$, $R_2$, $R_3$, $R_4$ and $R_5$, which may be identical or different, each represent, for example, a monovalent hydrocarbon radical selected from among straight or branched chain alkyl radicals containing from 1 to 12 carbon atoms, or substituted such radicals bearing one or more chlorine, bromine or fluorine atom substituents or a —CN group; and a phenyl radical optionally substituted by one or more alkyl and/or alkoxy radicals containing from 1 to 4 carbon atoms or by one or more chlorine atoms;

the symbol x is an integer within the range, for example, of from 2 to 8; and the symbols y and z represent integers or real numbers, which may be identical or different, the sum of which is, for example, within the range from 0 to 100.

For a compound of this type, when y and/or z are greater than 1, this is a compound having a polymeric structure and is rarely a single compound, but most frequently a mixture of compounds of the same chemical structure, which differ by the number of recurring units in their molecule. This provides an average value for y and/or z which may be an integer or a real number.

The practical value of these diamines containing a diorganopolysiloxane linkage is in their use as additives in lubricant compositions or surface-coating compositions, or in yet other applications, for example, as intermediates for the preparation of copolymers.

In accordance with the patents noted above, a first method for the preparation of these diamines, especially applicable when it is sought to prepare a compound in which y=z=0, i.e., when a diamine containing a diorganodisiloxane group is produced, consists in reacting a compound of the formula:

in which X is as defined above and M is an alkali metal or an alkaline earth metal, with a bis(haloalkyl)disiloxane of the formula:

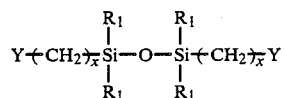

in which x has the value given above and Y is a chlorine, bromine or iodine atom, and conducting the reaction at a temperature of from 20° to 200° C. in the presence of an aprotic polar solvent.

In the case where it is desired to prepare a diamine in which y and/or z are other than O, a second preparation technique is described which consists in copolymerizing one mole of the diamine containing a diorganodisiloxane linkage prepared as mentioned above, with a quantity of one or more cyclic diorganopolysiloxanes adapted to provide y moles of siloxy group of the formula:

and/or z moles of siloxy groups of the formula:

The reaction is generally carried out at a temperature of from 80° to 250° C. in the presence, in this case as well, of a solvent and, optionally, in the presence of a suitable catalyst.

However, these prior art processes present a number of disadvantages such that their industrial value is minimized. In particular, it is observed that the majority of syntheses are carried out in solution in an organic solvent medium, which generally requires, upon completion of the reaction, one or more additional stages of distillation under reduced pressure in order to remove the reaction solvent. Additional equipment suitable for recovering the removed solvent and for purifying same prior to its recycle is also required. Moreover, on detailed examination of the prior art processes, for example those described in the aforenoted patents for the preparation of alpha, omega-bis(aminophenoxyalkyl)-polysiloxanes, it is observed that the temperatures and the reaction times employed in practice are generally fairly high: on the one hand, 7 to 8 hours of reaction between 110° and 122° are required in order to prepare the starting reagent of the formula:

and, one the other hand, about an additional 16 hours of reaction are required after the addition of the bis(-haloalkyl)disiloxane into the reaction medium. Finally, it appears from the prior art patents that the yields of the diamine desired do not exceed 85%

SUMMARY OF THE INVENTION

Accordingly, a major object of the present invention is the provision of an improved process for the preparation of diamines containing a diorganopolysiloxane bridge which is both simple and easy to carry out. Indeed, it is characteristically carried out at a temperature which is not very high, in a single stage, using a single apparatus and the reaction time is typically short.

Briefly, the present invention features the preparation of alpha, omega-bis(aminophenoxyalkyl)diorganopolysiloxanes by the direct hydrosilylation, in bulk, of aromatic allylamines with different alpha, omega-bis(hydrogeno)diorganopolysiloxanes in the presence of a catalyst.

DETAILED DESCRIPTION OF THE PREFERRED EMBODIMENTS OF THE INVENTION

More particularly according to the present invention, the subject diamines containing a diorganopolysiloxane linkage have the following general formula:

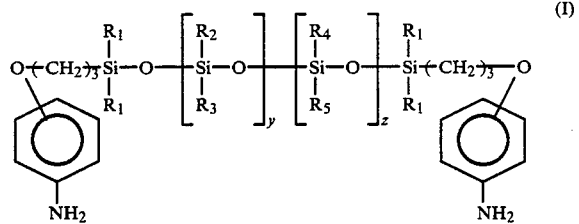

in which the oxygen of the phenoxyalkyl group is in the ortho, meta or para position relative to the carbon atom of the benzene ring bonded to nitrogen;

$R_1$, $R_2$, $R_3$, $R_4$ and $R_5$, which may be identical or different, each represent a monovalent hydrocarbon radical selected from among straight or branched chain alkyl radicals containing from 1 to 12 carbon atoms, or substituted such radicals bearing one or more chlorine, bromine or fluorine atom substituents or a —CN substitutent; or a phenyl radical optionally substituted by one or more alkyl and/or alkoxy radicals containing from 1 to 4 carbon atoms, or by one or more chlorine atoms; and the symbols y and z represent integers or real numbers, which may be identical or different, the sum of which ranges from 0 to 100.

These diamines are prepared by directly reacting
(a) an alpha, omega-bis(hydrogeno)diorganopolysiloxane of the formula:

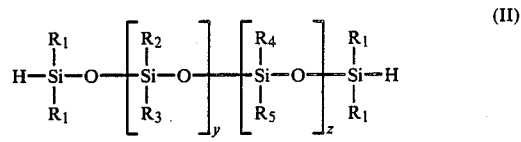

in which $R_1$, $R_2$, $R_3$, $R_4$, $R_5$, y and z are as defined above in connection with formula (I), with (b) an allyloxyaniline of the formula:

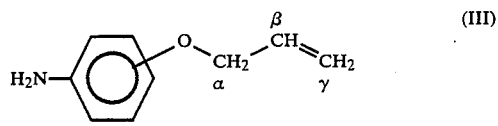

in which the allyloxy radical is in the ortho, meta or para position relative to the carbon atom of the benzene ring bonded to nitrogen.

This hydrosilylation reaction is carried out in bulk in the absence of a solvent, at a temperature not exceeding 120° C. and in the presence of a catalytically effective amount of a platinum group metal catalyst, whether in the metallic form or in the form of a compound based on a platinum group metal.

The alpha, omega-bis(hydrogeno)diorganopolysiloxanes of formula (II) are polymers which are well known in the silicone industry and some of which (completely alkylated polymers) are available commercially. They are described, for example, in French Pat. Nos. 2,486,952 and 2,058,988. In the case where these materials are not available commercially, they may be prepared, for example, by the cationic polymerization of appropriate alpha, omega-bishydroxylated diorganopolysiloxane oils followed by a transfer reaction using an agent such as, in particular, a dihydrogenotetraalkyldisiloxane.

As regards reagent (b), it is selected from among ortho-allyloxyaniline, meta-allyloxyaniline and paraallyloxyaniline.

These compounds may be prepared according to the processes described in the following references: *Journal of American Chemical Society*, 70, pages 592 to 594 (1948); *Chemical Abstracts*, 51, 4423 C (1957); *Journal of American Chemical Society*, 44, pages 1741 to 1744 (1922); and *Bulletin de la Societe Chimique de France*, pages 2154 to 2157 (1962).

In the process according to the present invention, reagent (b) is generally employed in quantities exactly equal to two moles per mole of reagent (a). However, the use of quantities of reagents (a) and (b) such that the molar ratio reagent (b): reagent (a) is within the range, for example from 1.90:1 to 2.1:1, is also within the ambit of the invention. Under these conditions, when the ratio under question is greater than 2:1 or less than 2:1, the unreacted reagent then serves as a diluent.

As regards the catalyst, the expression "platinum group metal" means that any of the following six metals of Group VIII of the Periodic Table may be employed: ruthenium, rhodium, palladium, osmium, iridium and platinum. The catalyst may be a platinum group metal in the metallic form, preferably deposited onto various supports such as carbon black, calcium carbonate, aluminas or equivalent materials. As the compound based on a platinum group metal, compounds capable of dissolving in the reaction medium may be employed. The residue linked to the metal is not critical provided it satisfies these conditions. Exemplary of these compounds, representative are inorganic or organic derivatives in which the metal atom may be in different oxidation states such as, especially, inorganic hydracid salts, inorganic oxyacid salts, aliphatic mono- or poly-carboxylic acid salts, complex salts obtained from the salts mentioned above and from mono- or polydentate ligands and complexes based on the metal element and mono- or polydentate ligands. Catalysts of this type are described, for example, in French Pat. No. 2,058,988.

For carrying out the process of the present invention, a catalyst of platinum in the metallic form or in the form of a platinum-based compound is preferably employed. More preferably, complexes based on elementary platinum and ligands of the alpha, omega-bis(vinyl)diorganopolysiloxane type are used. A catalyst which is very particularly well suited is a complex based on elementary platinum and 1,3-divinyl-1,1,3,3-tetramethyldisiloxane, commonly designated a Karsted catalyst.

The quantity of catalyst employed is selected such that the ratio r is as defined below:

$$\frac{\text{weight of platinum group metal element contained in the catalyst}}{\text{total weight of reagents } (a) + (b)}$$

is within the range of from $7 \times 10^{-6}$ to $200 \times 10^{-6}$. Of course, at concentrations as low as $7 \times 10^{-6}$, the hydrosilylation reaction does in fact take place; however, the reaction times may be too long and may not be compatible with an industrial process. Therefore, for reasons of an economic nature, a quantity of catalyst at which the ratio r is within the range of from $20 \times 10^{-6}$ to $100 \times 10^{-6}$ is preferably employed.

The catalyst may be introduced into the reaction medium either in the form in which it is naturally present, or in the form of a suspension or a solution in a suitable liquid diluent. In the case of the highly preferred catalyst which is a complex based on platinum and a siloxane ligand, the latter is generally employed in the form of a solution in a hydrocarbon such as, for example, benzene, toluene or cyclohexane.

In the process which has just been described, the rate of conversion of the starting reagents is 100% and the product diamines of formula (I) have a purity of, in a large majority of cases, a value of 100%. This reflects that the addition reaction of the functional groups

with the allyloxyaniline substrate occurs virtually with a selectivity of 100% on the τ-carbon atom in the formula (III). Moreover, no poisoning of the catalyst is observed irrespective of its concentration in the reaction medium. With respect to the prior art hereinbefore discussed, these are quite unexpected results. Indeed, in this type of chemistry, the teaching of the prior art implies that the development of at least two important interfering reactions must be expected, one consisting of the addition of the functional groups

to the β-carbon atom of the substrate of formula (III), and the other consisting of the reaction of the

groups with the terminal NH2 group of allyloxyaniline. The hydrosilylation of compounds containing unsaturated groups has been studied in detail in the literature. In particular, as regards the allylamine:

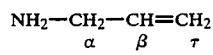

and its N-substituted derivatives, it is noted in the text, *Organometallic Chemistry Reviews,* published in 1977 by Elsevier Scientific Publishing Company, pages 52 and 53 and the references cited therein, that when the catalyst employed is a platinum derivative, the hydrosilylation of this substrate by H—Si(OC2H5)3 gives rise to a mixture of isomers by additions on the β- and τ-carbon atoms such as to obtain, on the one hand, the compounds NH2—CH2—CH(CH3)—Si(OC2H5)3 (20%) and, on the other hand, the compound NH2—CH2—CH2Si(OC2H5)3 (80%). It is also noted that an N-silylation reaction too may occur, providing the compound (C2H5O)3Si—NHCH2—CH2—CH2—Si(OC2H5)3.

As regards an aromatic alkene such as:

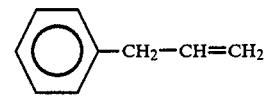

the aforementioned text also teaches (cf. pages 34 to 36) that, as in the case of the allylamine, the addition of H—Si(C2H5)3 may give rise to the formation of two isomers

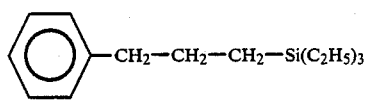

and

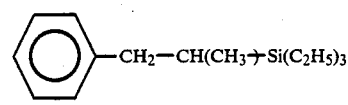

With regard to the hydrosilylation catalyst, it will also be seen from the aforementioned text, on page 4, that in a fairly general way, it is well known that the presence of various amines tends to inhibit its action of promoting the hydrosilylation reaction.

As the diamines which are preferably representative of the compounds prepared in accordance with the process according to the present invention, exemplary are those which correspond to the formula (I) in which:

(1) $R_1$, $R_2$, $R_3$, $R_4$ and $R_5$, which may be identical or different, each represent a straight or branched chain alkyl radical containing from 1 to 6 carbon atoms; and $y+z$ is within the range of from 0 to 100 and preferably from 4 to 70;

(2) $R_1$, $R_2$ and $R_3$, which may be identical or different, each represent a straight or branched chain alkyl radical containing from 1 to 6 carbon atoms; $R_4$ and $R_5$ each represent a phenyl radical, and $y+z$ is within the range of from 0 to 100 and preferably from 4 to 70;

(3) $R_1$, $R_2$ and $R_4$, which may be identical or different, each represent a straight or branched chain alkyl radical containing from 1 to 6 carbon atoms; $R_3$ and $R_5$ each represent a phenyl radical; and $y+z$ is within the range of from 0 to 100 and preferably from 4 to 70;

(4) $R_1$ represents a straight or branched chain alkyl radical containing from 1 to 6 carbon atoms; $R_2$, $R_3$, $R_4$ and $R_5$ each represent a phenyl radical; and $y+z$ is within the range of from 0 to 100 and preferably from 4 to 70.

Even more preferred are those which correspond to formula (I) in which:

(5) $R_1=R_2=R_3=R_4=R_5=$ a straight chain alkyl radical containing from 1 to 3 carbon atoms; and $y+z$ is within the range of from 0 to 100 and preferably from 4 to 70;

(6) $R_1=R_2=R_3=$ a straight chain alkyl radical containing from 1 to 3 carbon atoms; $R_4=R_5=$ a phenyl radical; and $y+z$ is within the range of from 0 to 100 and preferably from 4 to 70;

(7) $R_1=R_2=R_4=$ a straight chain alkyl radical containing from 1 to 3 carbon atoms; $R_3=R_5=$ a phenyl radical; and $y+z$ is within the range of from 0 to 100 and preferably from 4 to 70;

(8) $R_1=$ a straight chain alkyl radical containing from 1 to 3 carbon atoms; $R_2=R_3=R_4=R_5=$ a phenyl radical; and $y+z$ is within the range of from 0 to 100 and preferably from 4 to 70.

Most preferred diamines which are very particularly representative of the compounds prepared in accordance with the process according to the present invention are those which correspond to formula (I) in which:

(9) $R_1=R_2=R_3=R_4=R_5=$ a methyl radical; and $y+z$ is within the range of from 0 to 100 and preferably from 4 to 70;

(10) $R_1=R_2=R_3=$ a methyl radical; $R_4=R_5=$ a phenyl radical; and $y+z$ is within the range of from 0 to 100 and preferably from 4 to 70;

(11) $R_1=R_2=R_4=$ a methyl radical; $R_3=R_5=$ a phenyl radical; and $y+z$ is within the range of from 0 to 100 and preferably from 4 to 70;

(12) $R_1=$ a methyl radical; $R_2=R_3=R_5=$ a phenyl radical; and $y+z$ is within the range of from 0 to 100 and preferably from 4 to 70.

As specific examples of diamines which are very particularly representative of the compounds prepared in accordance with the present invention, the following are illustrative:

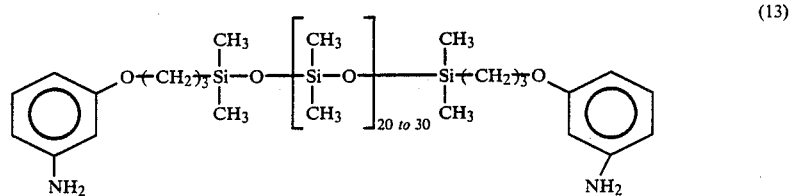

(13)

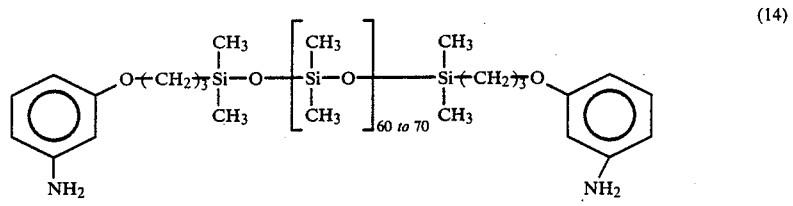

(14)

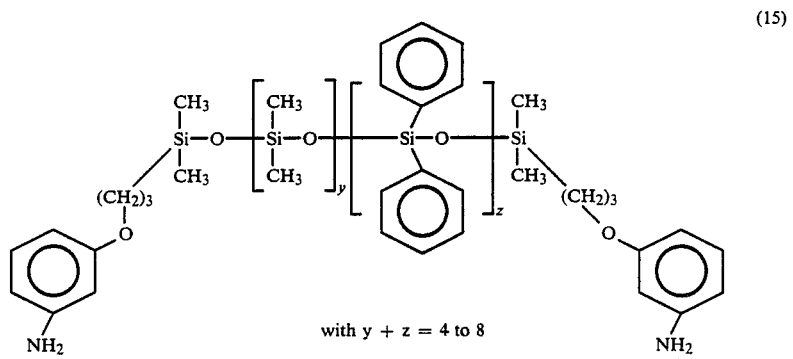

(15)

-continued

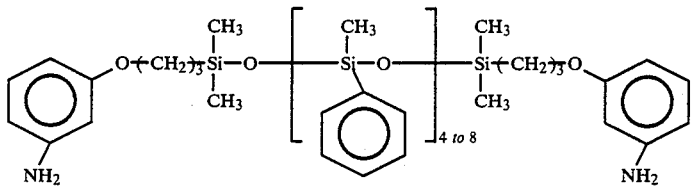
(16)

In practice, for carrying out the present invention, reagent (a) is first charged into the reactor employed and the catalyst is then added thereto. The allyloxyaniline (b) is then introduced into the reaction mass which is stirred; this introduction is done gradually such as to control the exothermicity of the reaction. The hydrosilylation reaction is generally carried out at a temperature of from 40° C. to 120° C. and preferably from 50° C. to 100° C., operating under an inert atmosphere of dried nitrogen. Once the introduction of the allyloxyaniline is complete, the reaction mixture is maintained under the abovementioned temperature conditions for a period of time not exceeding 6 hours and preferably ranging from 20 minutes to 2 hours.

In order to further illustrate the present invention and the advantages thereof, the following specific examples are given, it being understood that same are intended only as illustrative and in nowise limitative.

EXAMPLE 1

45 g (0.0216 mole) of an alpha, omega-bis(hydrogeno)diorganopolysiloxane of formula:

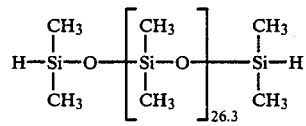

having a molecular weight on the order of 2082 g were charged into a glass reactor equipped with a central stirrer, a dropping funnel and a reflux condenser, in which a slight excess pressure of dry nitrogen had been established.

The reactor was then placed in an oil bath which had previously been heated to 55° C. and the catalyst was then added. The latter was the Karsted catalyst (complex based on elementary platinum and 1,3-divinyl-1,1,3,3-tetramethyldisiloxaneligands): it was dissolved in toluene (concentration of 3,5% by weight) and 120 microliters of this catalyst solution were introduced with a microsyringe; the ratio r (weight of elementary platinum employed: weight of reaction mass) was equal to $60 \times 10^{-6}$.

6.45 g (0.0432 mole) of meta-allyloxyaniline were then gradually introduced, over a period of 40 minutes, into the reactor such as to control the exothermicity of the reaction (the temperature was maintained at 55° C.). One hour after the completion of the addition, the temperature was lowered to ambient temperature. The product obtained, which weighed 51.4 g, was a clear viscous oil of an orange-brown color, having a proton NMR spectrum in agreement with the structure:

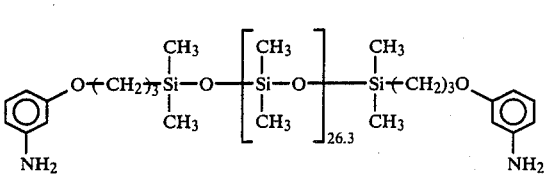

The molecular weight was on the order of 2380 g. Under these conditions, the conversion rate of the reagents employed was 100% (neither the amine nor the hydrogenated siloxane oligomer was detected by NMR and infrared spectroscopies) and the gravimetric yield of the diamine desired was 100%.

EXAMPLE 2

The procedure was the same as that described in Example 1, except with regard to the following points:

20 g (0.004 mole) of an alpha, omega-bis(hydrogeno)-diorganopolysiloxane of the following formula, the molecular weight of which was on the order of 4982 g, were charged:

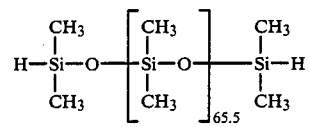

50 microliters of the catalyst solution were employed; the ratio r (weight of elementary platinum: weight of reaction mass) was equal to $64 \times 10^{-6}$; and 1.2 g (0.008 mole) of meta-allyloxyaniline were introduced, over 45 minutes, into the reactor and the temperature was lowered to ambient temperature 30 minutes after the completion of the addition of this reagent.

The product obtained, which weighed 21.1 g, was a viscous oil, orange in color, having a proton NMR spectrum in agreement with the structure:

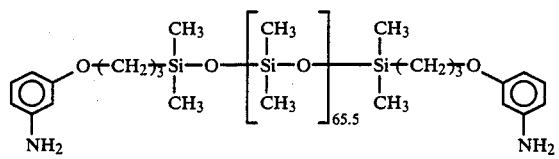

and having a molecular weight on the order of 5280 g. Under these conditions, the conversion rate of the reagents employed was 100% (neither the amine nor the hydrogenated siloxane oligomer was detected by NMR and infrared spectroscopies) and the gravimetric yield of the diamine desired was 100%.

EXAMPLE 3

The procedure was the same as that described in Example 1, except with regard to the following points:

105 g (0.07 mole) of an alpha, omega-bis(hydrogeno)-diorganopolysiloxane of the following formula, the molecular weight of which was on the order of 1492 g, were charged:

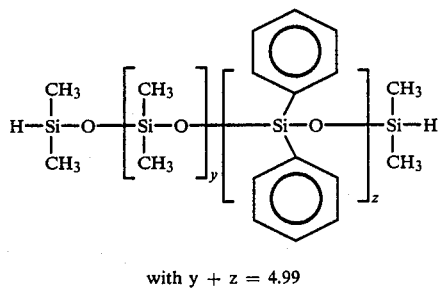

with y + z = 4.99

350 microliters of the catalyst solution were employed; the ratio r (weight of elementary platinum: weight of reaction mass) was equal to $75 \times 10^{-6}$; and 21 g (0.14 mole) of meta-allyloxyaniline were introduced, over 50 minutes, into the reactor and the temperature was lowered to ambient temperature 30 minutes after the completion of the addition of this reagent.

The product obtained, which weighed 125.3 g, was a viscous oil, brown in color, having a proton NMR spectrum in agreement with the structure:

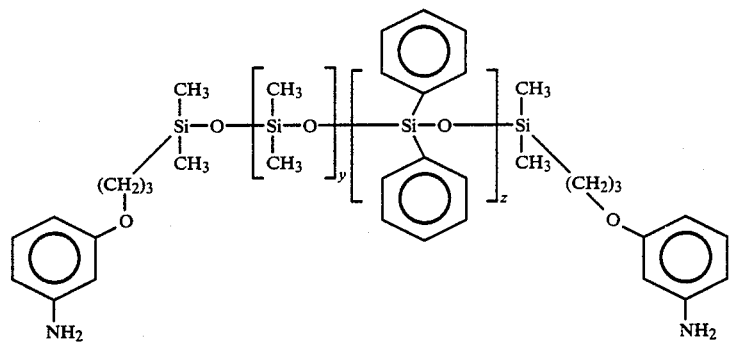

with y + z = 4.99 and having a molecular weight on the order of 1790 g. Under these conditions, the conversion rate of the reagents employed was 100% (neither the amine nor the hydrogenated siloxane oligomer was detected by NMR and infrared spectroscopies) and the gravimetric yield of the diamine desired was 100%.

EXAMPLE 4

The procedure was the same as that described in Example 1, except with regard to the following points:

312 g (0.46 mole) of an alpha, omega-bis(hydrogeno)-diorganopolysiloxane of the following formula, the molecular weight of which was on the order of 678 g, were charged:

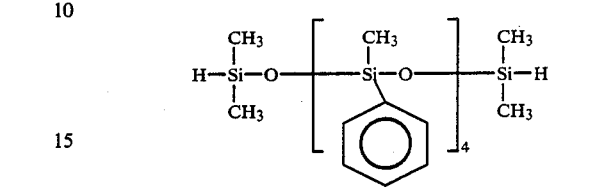

1.49 cm$^3$ of the catalyst solution were employed; the ratio r (weight of elementary platinum: weight of reaction mass) was equal to $91 \times 10^{-6}$; and 137 g (0.92 mole) of meta-allyloxyaniline were introduced, over 60 minutes, into the reactor and the temperature was lowered to ambient temperature 30 minutes after the completion of the addition of this reagent.

The product obtained, which weighed 448.9 g, was a viscous oil, orange-brown in color, having a proton NMR spectrum in agreement with the structure:

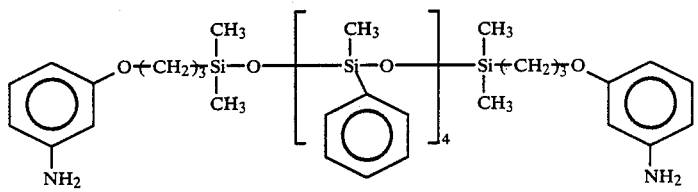

and having a molecular weight on the order of 976 g. Under these conditions, the conversion rate of the reagents employed was 100% (neither the amine nor the hydrogenated siloxane oligomer was detected by NMR and infrared spectroscopies) and the gravimetric yield of the diamine desired was 100%.

EXAMPLE 5

The procedure was the same as that described in Example 1, except with regard to the following points:

2 g ($9.6 \times 10^{-4}$ mole) of an alpha, omega-bis(hydrogeno)diorganopolysiloxane of the following formula, having a molecular weight on the order of 2082 g, were charged:

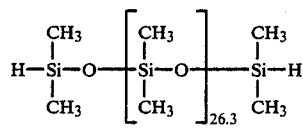

0.6 microliter of the catalyst solution was employed; the ratio r (weight of elementary platinum: weight of reaction mass) was equal to $7 \times 10^{-6}$; and 0.286 g ($1.92 \times 10^{-3}$ mole) of meta-allyloxyaniline was introduced, over 10 minutes, into the reactor and the progress of the reaction was monitored by infrared spectrometry. Approximately 48 hours of reaction at 55° C. were required for the total disappearance of the Si-H band on the infrared spectrum ($\nu = 2150$ cm$^{-1}$ and 920 cm$^{-1}$).

The diamine obtained was that described above in Example 1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a diorganopolysiloxylated diamine having the general formula (I):

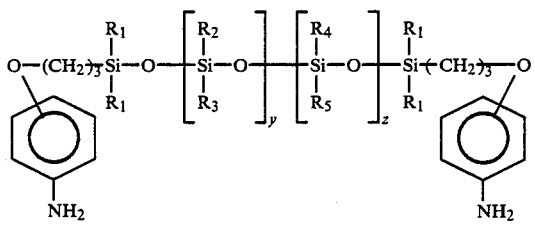

in which:
the oxygen of the phenoxyalkyl group is in the ortho, meta or para position relative to the carbon atom of the benzene ring bonded to nitrogen;
$R_1$, $R_2$, $R_3$, $R_4$ and $R_5$, which may be identical or different, are each a straight or branched chain alkyl radical containing from 1 to 12 carbon atoms, or a substituted such radical bearing one or more chlorine, bromine or fluorine atom substituents or a —CN substituent; or a phenyl radical optionally substituted by one or more alkyl and/or alkoxy radicals containing from 1 to 4 carbon atoms or by one or more chlorine atoms; and
the symbols y and z represent integers or real numbers, which may be identical or different, the sum of which ranges from 0 to 100; said process being suitable for the preparation of the polysiloxylated diamine of the formula (I) with 100% selectivity by directly reading:

(a) an alpha, omega-bis(hydrogeno)diorganopolysiloxane of the formula:

$$H-\underset{\underset{R_1}{|}}{\overset{\overset{R_1}{|}}{Si}}-O\left[\underset{\underset{R_3}{|}}{\overset{\overset{R_2}{|}}{Si}}-O\right]_y\left[\underset{\underset{R_5}{|}}{\overset{\overset{R_4}{|}}{Si}}-O\right]_z\underset{\underset{R_1}{|}}{\overset{\overset{R_1}{|}}{Si}}-H$$

in which $R_1$, $R_2$, $R_3$, $R_5$, y and z are as defined above, with:

(b) an allyloxyaniline of the formula:

$$H_2N-\underset{}{\bigcirc}-O-CH_2-CH=CH_2$$

which the allyloxy radical is in the ortho, meta or para position relative to the carbon atom of the benzene ring bonded to nitrogen, in bulk in the absence of a solvent, at a temperature not exceeding 120° C., and in the presence of a catalytically effective amount of a platinum group metal catalyst.

2. The process as defined by claim 1, wherein the reagent (b) is employed in amounts equal to two moles per mole of reagent (a).

3. The process as defined by claim 1, said catalyst comprising platinum metal or a platinum-based compound.

4. The process as defined by claim 1, wherein the amount of catalyst is such that the ratio r:

$$\frac{\text{weight of platinum group metal element contained in the catalyst}}{\text{total weight of reagents } (a) + (b)}$$

ranges from $7 \times 10^{-6}$ to $200 \times 10^{-6}$.

5. The process as defined by claim 1, comprising first charging the reagent (a) into a reaction zone, adding the catalyst thereto, and then gradually introducing the allyloxyaniline (b) into the reaction mass, under stirring.

* * * * *